July 25, 1972
F. W MACONE
3,679,512
LAMINATED CARD ENVELOPE
Original Filed April 19, 1967
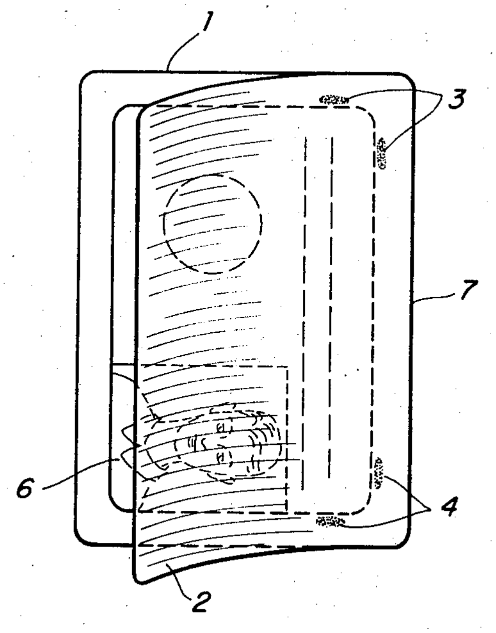
FREDERICK W. MACONE
INVENTOR
BY Robert L. Nathans
ATTORNEY United States Patent Office 3,679,512

Patented July 25, 1972

3,679,512

LAMINATED CARD ENVELOPE

Frederick W. Macone, Carlisle, Mass., assignor to Avant Corporation, Lincoln, Mass.

Original application Apr. 19, 1967, Ser. No. 632,072, now Patent No. 3,526,567. Divided and this application May 20, 1970, Ser. No. 39,035

Int. Cl. B32b *31/20;* G09f *3/02*

U.S. Cl. 156—272 2 Claims

ABSTRACT OF THE DISCLOSURE

This disclosure illustrates a novel envelope for receiving and properly orienting a data card positioned within the envelope which is thereafter subjected to heat and pressure to produce a composite, multilayered laminated card.

The present invention relates to a laminated card envelope for facilitating the manufacture of laminated cards.

CROSS REFERENCE TO RELATED APPLICATION

This application is a division of application Ser. No. 632,072, now Pat. No. 3,526,567, filed Apr. 19, 1967, assigned to the same assignee as the present invention.

BACKGROUND OF THE INVENTION

Laminated cards containing printed or pictorial data cards are usually produced by manually orienting the data card with respect to the inside faces of the larger outer plastic sheets which "sandwich" the data card. Generally it is desirable to manipulate the data card so that its edges are parallel to the edges of the outer plastic sheets and so that the border surrounding the data card is even or symmetrical. Often, before the composite card, bearing the centered data card, is exposed to heat and laminating pressure in the laminator the inner data card changes position to produce an unsightly card or even a ruined one where the data card extends beyond the edges of the outer plastic sheets. Additionally, a given predetermined position of the inner card with respect to the outer plastic sheets is required if the laminated card is to be embossed or coded for automatic data processing reading equipment. The positioning of the inner data card is sometimes further impeded by a moist card (e.g., a photographic print not fully dried) sticking to the inside faces of the outer plastic cards. The envelope of the present invention is constituted so that a moist photographic print may be rapidly inserted and properly oriented without rubbing or being pressed against the inner faces of the plastic sheets which causes abrasion and consequent damaging of the moist emulsion surface. In any event, it is highly desirable, especially for rapid production, to provide means for rapidly and accurately positioning the inner data card with respect to the outer plastic cards in a manner which impedes shifting of the inner card before lamination.

SUMMARY OF THE INVENTION

In accordance with a preferred embodiment of the invention, first and second outer plastic sheets are heat sealed or spot welded to produce a pair of nests each consisting of orthogonally positioned elongated welds, separated by an amount substantially equal to a major dimension (length or width) of the inner data card. The welds or seals couple and maintain the outer sheets in a congruent relationship, while they act as nests to receive and properly orient the inner data card which may be inserted in a second or so. Since the nests lie just outside of the corner edges of the cards, they prevent a shift in card position before lamination.

SPECIFIC DESCRIPTION

The figure illustrates outer plastic cards 1 and 2, sealed or welded together by nests 3 and 4 each consisting of elongated, orthogonally positioned seals or welds. "L" shaped electrodes may be applied to the congruent cards to heat seal or weld them as shown. The nests are preferably positioned just beyond the corner edges of the inner inserted data card 6 so as to "frame" the card and prevent the aforesaid shifting. The elongated welds or seals making up each nest need not actually intersect, and for that matter need not necessarily be elongated. The outer sheets may be completely separate before being coupled together by the seals or could be formed of a single double sized sheet of plastic folded along edge 7.

The folding of a double sized plastic sheet before insertion of the data card and lamination, with or without the aforesaid nests, is particularly suitable for very high mass production where the outer sheets need not be of different material. In the absence of nests and for certain applications, the fold itself acts to maintain the outer sheets in the proper relationship and may be used to orient the data card where a major dimension of the card, such as its length or width, is positioned against the fold. Also, this approach may be utilized in conjunction with a single spot weld or heat seal. In other words, the length of the card, for example, may be positioned against the fold and its width may be positioned against a single elongated or spot weld.

Obviously, many modifications and variations of the present invention are possible in the light of the above teachings. It is therefore to be understood, that within the scope of the appended claims, the invention may be practiced otherwise than as specifically described.

I claim:

1. A method of producing a laminated data card having a plurality of edges comprising the steps of:

(A) providing an envelope having:

(1) coupling means positioned between the inner heat activatable adhesive-bearing surfaces of a pair of outer sheets to be laminated together for maintaining said outer sheets in a congruent face-to-face relationship with each other;

(2) said coupling means being positioned with respect to said pair of outer sheets for permitting wide separation of major portions of the outer coupled sheets;

(3) said coupling means being positioned with respect to the edges of said pair of outer sheets for properly locating an edge of an inner data-bearing sheet inserted between said coupled outer sheets and abutting said coupling means;

(B) separating said outer sheets along at least two adjacent edges to permit an inner data-bearing sheet to be easily and rapidly inserted between said outer sheets and gripped thereby;

(C) inserting an inner data-bearing sheet between said outer sheets and against said coupling means for accurately positioning an edge of said data-bearing sheet with respect to said outer sheets; and (D) laminating said outer sheets and said inner data-bearing sheet together by the application of heat thereto.

2. The method of claim 1 wherein said coupling means is formed by heat sealing said first and second outer sheets together at widely separated portions of said outer sheets to provide for accurate alignment of the edges of said inner data bearing sheet with respect to the coupled outer sheets.

References Cited

UNITED STATES PATENTS

| | | | |
|---|---|---|---|
| 2,006,744 | 7/1935 | Pierce | 40—2.2 |
| 2,294,796 | 9/1942 | Moulder | 156—290 X |
| 2,444,685 | 7/1948 | Waters | 156—290 |
| 2,767,756 | 10/1956 | Niles | 156—290 X |

FOREIGN PATENTS

| | | | |
|---|---|---|---|
| 1,356,311 | 2/1962 | Sweden | 156—290 |

CARL D. QUARFORTH, Primary Examiner

E. E. LEHMANN, Assistant Examiner

U.S. Cl. X.R.

40—1.5, 2.2; 156—290, 293, 306; 283—7